(12) United States Patent
McCoy

(10) Patent No.: US 7,852,811 B2
(45) Date of Patent: Dec. 14, 2010

(54) COMMUNICATION SYSTEM WITH MIMO CHANNEL ESTIMATION USING PEAK-LIMITED PILOT SIGNALS

(75) Inventor: James W. McCoy, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 931 days.

(21) Appl. No.: 11/346,649

(22) Filed: Feb. 3, 2006

(65) Prior Publication Data

US 2007/0183371 A1    Aug. 9, 2007

(51) Int. Cl.
*H04Q 7/00* (2006.01)

(52) U.S. Cl. .................. 370/334; 375/260; 375/267; 375/299; 375/340; 375/347; 455/273; 370/335; 370/340; 370/208; 370/350; 370/491

(58) Field of Classification Search .......... 370/334, 370/208, 350, 491, 335, 340; 375/260, 267, 375/299, 340, 347, 316, 329; 455/273, 571, 455/127.1

See application file for complete search history.

(56) References Cited

U.S. PATENT DOCUMENTS

| | | | | |
|---|---|---|---|---|
| 7,409,015 B1 * | 8/2008 | Misra et al. | ................. | 375/329 |
| 2002/0051435 A1 | 5/2002 | Giallorenzi et al. | | |
| 2004/0076224 A1 * | 4/2004 | Onggosanusi et al. | ....... | 375/144 |
| 2004/0165524 A1 | 8/2004 | Chen et al. | | |
| 2006/0018402 A1 * | 1/2006 | Mehta et al. | ................ | 375/299 |
| 2007/0004465 A1 | 1/2007 | Papasakellariou et al. | | |
| 2007/0110135 A1 | 5/2007 | Guess et al. | | |
| 2007/0189151 A1 | 8/2007 | Pan et al. | | |
| 2007/0195906 A1 | 8/2007 | Kim et al. | | |
| 2008/0043877 A1 | 2/2008 | Chen | | |
| 2008/0043883 A1 | 2/2008 | McCoy | | |

OTHER PUBLICATIONS

Nadia Khaled et al., "Quantized Multi-Mode Pre-coding for Spatial Multiplexing MIMO-OFDMA systems", 2005, IEEE.*

J. Kotecha, et al., "Transmit Signal Design for Optimal Estimation of Correlated MIMO Channels," IEEE Transactions on Signal Processing, vol. 52, No. 2, Feb. 2004, pp. 546-557.

J. Tellado, "Multicarrier Modulation with Low Peak to Average Power Applications to xDSL and Broadband Wireless," ISBN: 0792379888, Jan. 1, 2000.

Office Action on Related U.S. Appl. No. 11/466,007, mailed Jun. 12, 2009.

(Continued)

*Primary Examiner*—Kamran Afshar
*Assistant Examiner*—Joseph Arevalo
(74) *Attorney, Agent, or Firm*—Dillon & Yudell LLP

(57) ABSTRACT

In a collaborative, multiple input, multiple output wireless communication system, a transmitting device transmits a peak-limited pilot signal to a receiving device. The receiving device independently synthesizes the same pilot signal transmitted by the transmitting device. The synthesis process involves precoding the pilot signal and peak limiting the precoded pilot signal. The receiving device receives a signal r that represents the product of (i) a channel matrix H between the transmitting device and the receiving device and (ii) the peak-limited pilot signal $y_p(n)'$ plus noise $\eta$, i.e. $r=Hy_p(n)'+\eta$. The synthesized, peak-limited pilot signal can then be used by a channel estimator to determine an estimated channel matrix $\hat{H}$. Thus, the estimated channel matrix $\hat{H}$ represents a closer estimate of the channel matrix H than conventional channel estimation processes and, thus, can provide better corresponding performance than conventional MIMO wireless communication systems.

18 Claims, 5 Drawing Sheets

OTHER PUBLICATIONS

Response to Office Action on Related U.S. Appl. No. 11/466,007, Jul. 14, 2009.

Office Action on Related U.S. Appl. No. 11/466,007, mailed Nov. 4, 2009.

Response to Office Action on Related U.S. Appl. No. 11/466,007, Nov. 17, 2009.

Armstrong, J., Peak-to-average power reduction for OFDM by repeated clipping and frequency domain filtering, Electronicss Letters; Feb. 28, 2009, pp. 246-247, vol. 38, No. 5, IEEE.

Motorola, PA Power de-rating reduction scheme for DFT-SOFDM and TP, 3GPP RAN meeting, Feb. 13-17, 2006, 9 pps.

Office Action on Related U.S. Appl. No. 11/465,976, mailed Jun. 23, 2009.

Office Action on Related U.S. Appl. No. 11/465,976, mailed Dec. 24, 2009.

Office Action on Related U.S. Appl. No. 11/466,007, mailed Dec. 9, 2009.

\* cited by examiner

COMMUNICATION SYSTEM WITH MIMO CHANNEL ESTIMATION USING PEAK-LIMITED PILOT SIGNALS

BACKGROUND OF THE INVENTION

1. Field of the Invention

The present invention relates in general to the field of information processing, and more specifically to a multiple input-multiple output ("MIMO") communication system and method for estimating a MIMO channel using transmission device and receiving device peak-limited pilot signals.

2. Description of the Related Art

The demand for wireless communication systems continues to expand. Wireless communication systems transmit and receive signals within a designated electromagnetic frequency spectrum. Wireless communication systems involve data communication between a subscriber station and a base station. Base stations and subscriber stations can be both transmitting devices and receiving devices when both base stations and subscriber stations are equipped with a receiver and a transmitter. Base stations generally communicate with multiple subscriber stations. Subscriber stations communicate directly with a base station and indirectly, via the base station, with other subscriber stations. The number of base stations depends in part on the geographic area to be served by the wireless communication system. Subscriber systems can be virtually any type of wireless one-way or two-way communication device such as cellular telephones, wireless equipped computer systems, and wireless personal digital assistants. The signals communicated between base stations and subscriber stations can include data such as voice, electronic mail, and video.

FIG. 1 depicts a multiple input, multiple output (MIMO) communication system 100 with a subscriber station 102 and a base station 104. The MIMO communication system 100 can include other subscriber stations and base stations. In a MIMO system, each subscriber station 102 includes a transmitter 105 with a respective array of antennas 106.1-106.$k$. Each base station 104 includes a receiver 107 with a respective array of antennas 108.1-108.$m$ for receiving signals, where k and m are integers greater than one (1). The values of k and m are a matter of design choice, and k may or may not equal m. MIMO communication systems utilize multiple base station antennas and multiple subscriber station antennas to improve performance.

Subscriber station 102 includes precoder 110 to precode the signal to be transmitted, signal x(n), in accordance with a precoder matrix P. (Note, a vector is represented by bolded lower case letters, such as x, and a matrix is represented by bolded upper case letters, such as P). Signal x(n) is a k element vector, and represents the $n^{th}$ sample of a sequence of data x. During a complete transmission, generally each sample of sequence x is transmitted. In at least one embodiment, the precoder matrix P is a k by k matrix with each column of precoder matrix P representing complex beam forming weight vectors. The element values of precoder matrix P are a matter of design choice. Many conventional techniques exist to design precoder matrix P. The elements of precoder matrix P are generally designed so that the precoder matrix P precodes signal x(n) to allow the base station 104 to distinguish between the transmission signal of subscriber station 102 and other subscriber stations (not shown). The k element vector y represents the output of precoder 110 and, in at least one embodiment, is the product of precoder matrix P and signal x(n), i.e. y=Px(n).

A frequently encountered disadvantage of MIMO communication systems involves output samples with a high peak-to-average power ratio (PAR). Subscriber station 102 and base station 104 have a limited amount of power per antenna to transmit a signal, such as the transmission signal vector y(n)'. Typically, the maximum power available for transmission is correlated with a maximum amplitude signal sample. If the ratio between the maximum amplitude signal sample and the average amplitude of the signal samples is large, the amount of power allocated to transmit average power signal samples is relatively low. A high PAR often results in low power efficiency and possible non-linear distortion.

Various peak limiting techniques exist to decrease the PAR while attempting to minimize distortion and increase power efficiency. "Tone Reservation" represents one such peak limiting technique. An example of tone reservation to reduce the PAR is described in J. Tellado-Mourelo, *Peak to Average Power Reduction for Multicarrier Modulation*, Ph.D. dissertation, Stanford University, Stanford, Calif., September 1999 (referred to herein as Tellado), which is incorporated by reference herein in its entirety.

Peak limiters 112.1-112.$k$ apply peak limiting technology, such as tone reservation, to peak limit the first through kth elements of the precoded signal y(n) and generate a peak limited transmission signal y(n)' for each of the samples x(n) of pilot sequence x. Subscriber station 102 then transmits transmission signal y(n)' to base station 104 and repeats the transmission for each of the transmission signal samples y(n)'. In at least one embodiment, peak limiting is performed serially on each of samples y(n) using a processor executing a peak limiting algorithm.

Subscriber station 102 transmits signal vector y(n)' via a channel represented by the channel matrix H. The channel matrix H represents a channel gain between the antenna array 106.1-106.$k$ and the antenna array 108.1-108.$m$ Thus, the channel matrix H can be represented by a k×m matrix of complex coefficients. The coefficients of the channel matrix H depend, at least in part, on the geometry and material composition of signal reflective objects.

In a correlated communication system, the subscriber station 102 uses a pilot sequence vector $x_p$ to allow the receiving base station 104 to determine an estimate of the channel matrix H. The content of each sample $x_p(n)$ of the pilot sequence $x_p$ is a matter of design choice. In one embodiment, the pilot sequence $x_p$ is a constant amplitude, zero autocorrelation (CAZAC) sequence. The subscriber station transmits a precoded, peak limited pilot signal $y_p(n)'$ to base station 104.

Base station 104 includes a receiver 107 that receives a signal r on antennas 108.1-108.$m$. The received signal r represents the peak limited pilot signal $y_p$' as modified by the channel matrix H and noise n, such that received signal r equals the product of the channel matrix H and the peak limited pilot signal $y_p(n)'$ plus noise, i.e. $r=Hy_p(n)'+\eta$. The noise vector $\eta$ is an m element vector representing noise added by, for example, random vibration of electrons in each of antennas 108.1-108.$m$. Channel estimator 114 determines an estimated channel matrix $\hat{H}$. Several conventional methods exist to determine the elements of the estimated channel matrix $\hat{H}$ using the known pilot sequence $x_p$.

Once the estimated channel matrix $\hat{H}$ is known, the base station 104 uses decoder 116 to decode future received signals $r=Hy_p(n)'+\eta$. Since the channel matrix H can change over time and as the location of the subscriber station 102 changes, the process used to determine the estimated channel matrix $\hat{H}$ can be repeated as desired. Additionally, the process used to determine the estimated channel matrix $\hat{H}$ can be reversed with the base station 104 becoming the transmitting device and the subscriber station 102 becoming the receiving device.

Conventionally, since peak limiting relates to transmission power limitations, peak limiting techniques have been applied only to the input signal x by the transmitting device, e.g. the subscriber station 102 in FIG. 1. However, the channel estimator 114 uses a non-peak limited pilot sequence $x_p$ to estimate the channel matrix $\hat{H}$. The resulting estimated channel matrix channel matrix $\hat{H}$ is, thus, based upon inaccurate data.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

In a collaborative, multiple input, multiple output (MIMO) wireless communication system, a transmitting device transmits a peak-limited pilot signal to a receiving device. The receiving device independently synthesizes the same pilot signal transmitted by the transmitting device. The synthesis process involves precoding the pilot signal and peak limiting the precoded pilot signal. The receiving device receives a signal r that represents the product of (i) a channel matrix H between the transmitting device and the receiving device and (ii) the peak-limited pilot signal $y_p(n)'$ plus noise η, i.e. $r=Hy_p(n)'+\eta$. The synthesized, peak-limited pilot signal can then be used by a channel estimator to determine an estimated channel matrix $\hat{H}$. Thus, the estimated channel matrix $\hat{H}$ represents a closer estimate of the channel matrix H than conventional channel estimation processes and, thus, can provide better corresponding performance than conventional MIMO wireless communication systems.

Figure 1:
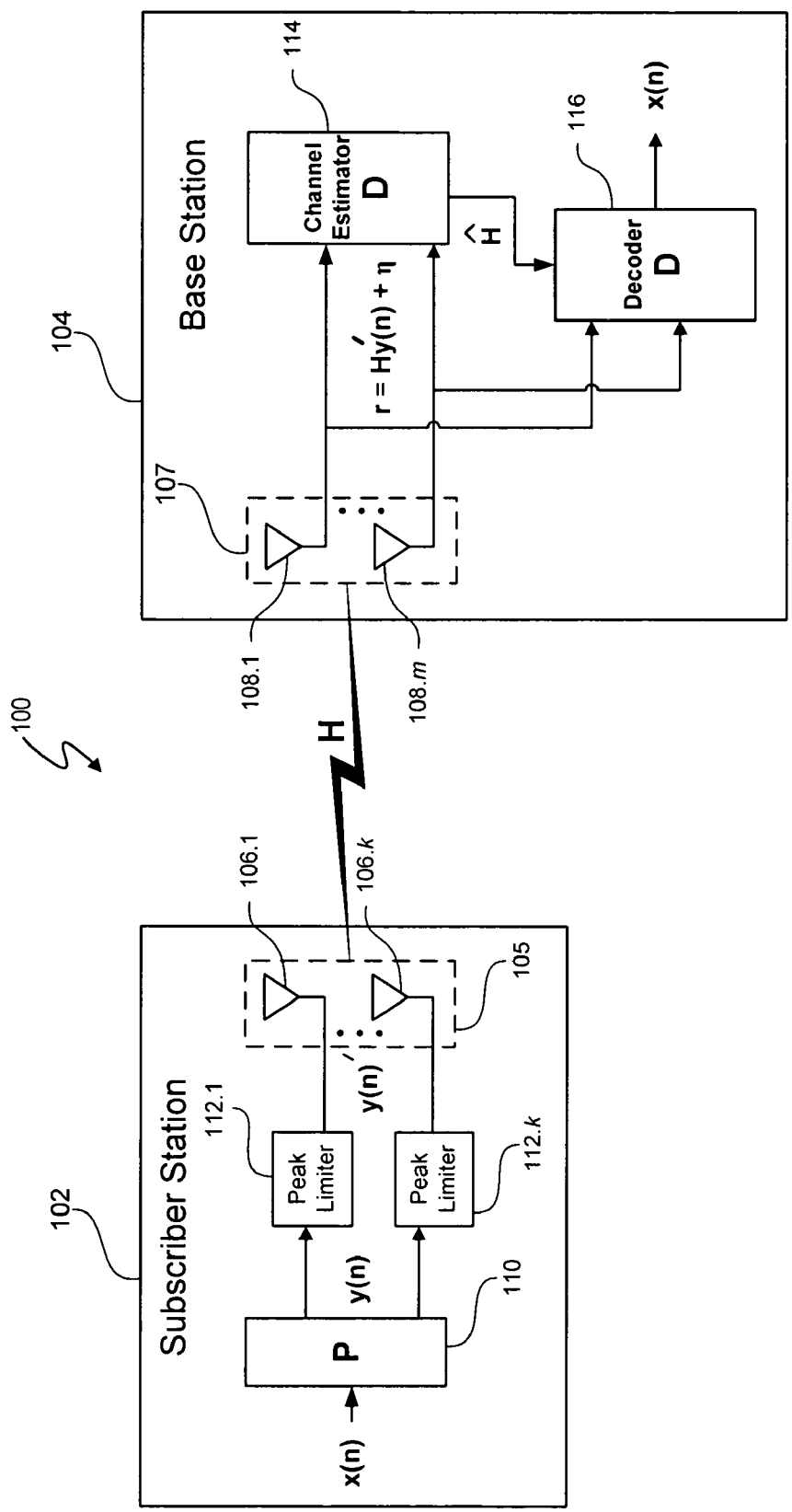
FIG. 1 (labeled prior art) depicts a MIMO wireless communication system with transmitting device peak limiting.
Figure 2:
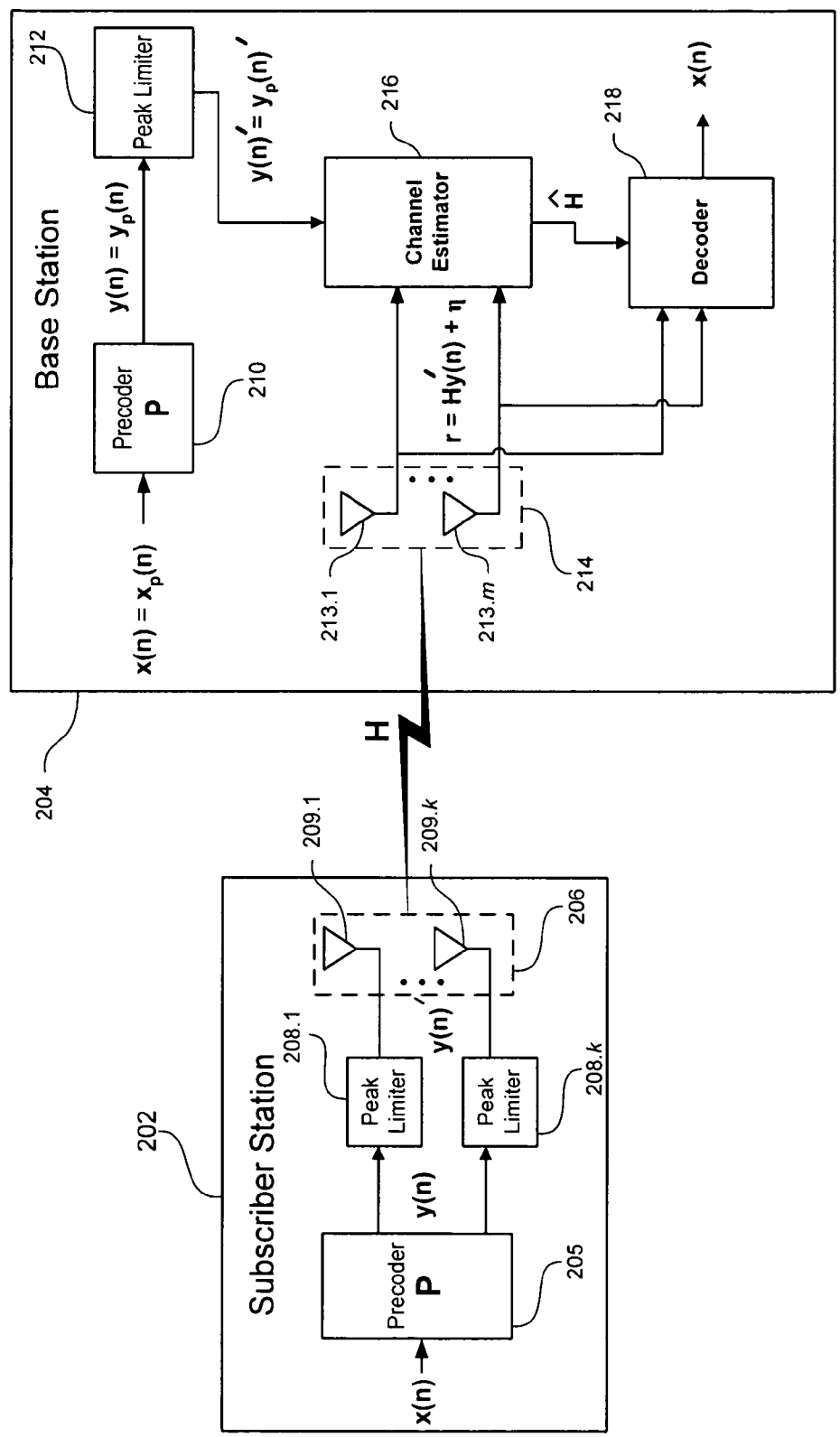
FIG. 2 depicts a MIMO wireless communication system with transmitting device and receiving device peak limiting for channel estimation.

FIG. 2 depicts MIMO wireless communication system 200 that includes transmitting device and receiving device peak limiting for channel estimation. The communication system 200 includes a subscriber station 202 that communicates in a wireless environment with a base station 204 and indirectly, via the base station 204, with other subscriber stations. Subscriber station 202 and base station 204 can be implemented using any type of MIMO transmission device. The signal x represents the data to be transmitted by subscriber station 202 to base station 204. In at least one embodiment, the signal x(n) is a k element vector and represents each sample of data sequence x. "k" equals the number of antennas in transmitter 206 and is an integer greater than or equal to two (2). In at least one embodiment, k equals two (2). To effectively communicate with the base station 204, the subscriber station 202 utilizes a pilot sequence $x=x_p$ to allow the base station 204 to estimate the channel matrix $\hat{H}$. The contents of pilot sequence $x_p$ is a matter of design choice. Each sample $x_p(n)$ of pilot sequence $x_p$ is, for example, a sample from a CAZAC sequence.

Figure 3:
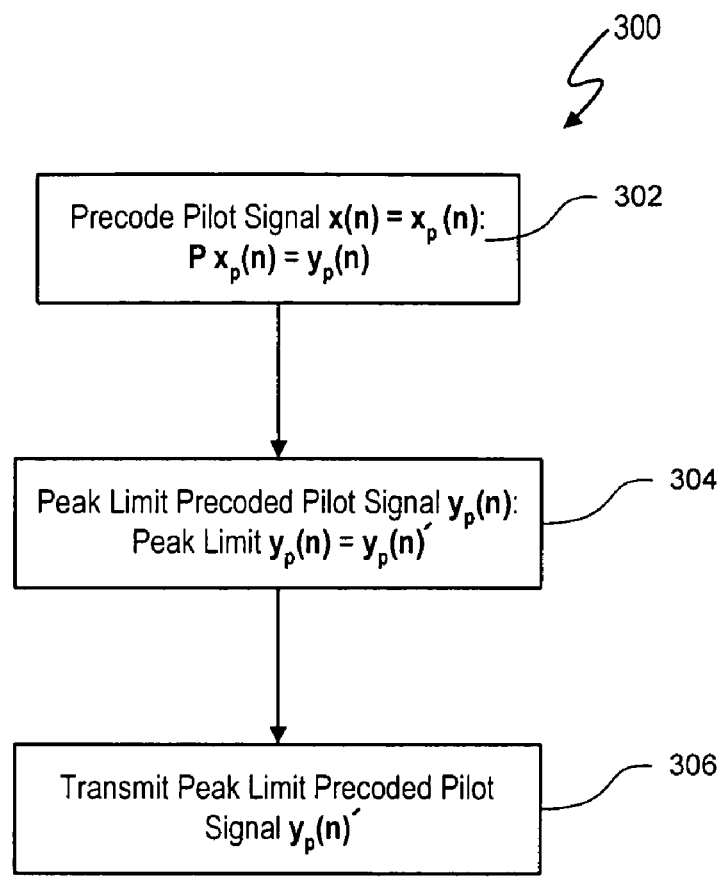
FIG. 3 depicts a MIMO wireless communication peak-limiting transmitting device channel estimation process.
Figure 4:
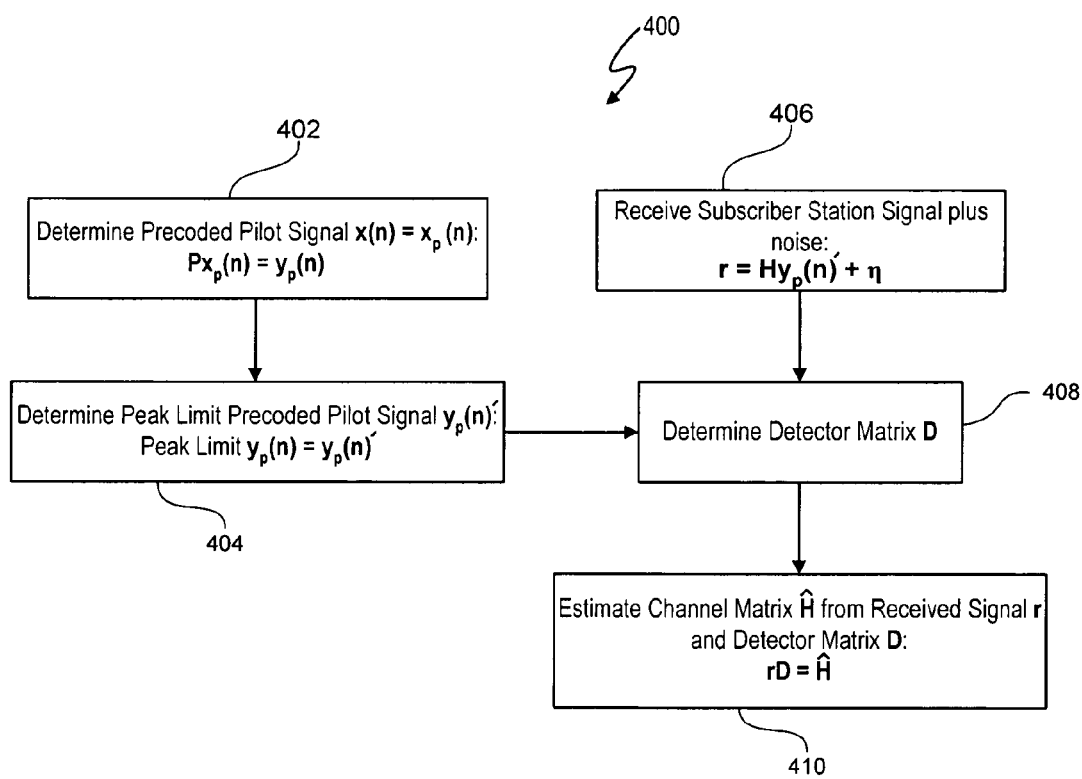
FIG. 4 depicts a collaborative, MIMO wireless communication receiving device channel estimation process.

Referring to FIGS. 3 and 4, in at least one embodiment, communication system 200 utilizes a pilot signal $x_p(n)$, which represents each sample of pilot sequence $x_p(n)$, to estimate a channel matrix H in accordance with the collaborative, MIMO communication transmitting device channel estimation process 300 and receiving device channel estimation process 400. In operation 302, precoder 205 precodes the pilot signal $x_p(n)$ using precoder matrix P. In at least one embodiment, the precoder matrix P is a k by k matrix with each column of precoder matrix P representing complex beam forming weight vectors. The element values of precoder matrix P are a matter of design choice. Many conventional techniques exist to design precoder matrix P. The elements of precoder matrix P are generally designed so that the precoder matrix P precodes signal $x_p(n)$ to allow the base station 204 to distinguish between the transmission signal of subscriber station 202 and other subscriber stations (not shown). The k element vector y represents the output of precoder 205 and, in at least one embodiment, is the product of precoder matrix P and signal $x_p(n)$, i.e. $y_p(n)=Px_p(n)$. When precoding each sample $x_p(n)$ of the pilot signal $x_p$, the output of decoder 204 is $y(n)=y_p(n)$.

To address the problems associated with high PAR values of signal y(n), in operation 304, peak limiters 208.1-208.k apply peak limiting technology to peak limit the precoded signal y(n) and generate a peak limited transmission signal y(n)'. In one embodiment, peak limiters 208.1-208.k peak limit precoded signal y(n) using tone reservation technology as, for example, described in Tellado. In at least one embodiment, peak limiting is performed serially on each of samples y(n) using a processor executing a peak limiting algorithm.

In operation 306, transmitter 206 transmits the peak limited precoded pilot signal $y_p(n)'$ to base station 204 using antennas 209.1-209.k. The $i^{th}$ antenna 219.i of transmitter 206 transmits the $i^{th}$ element of peak limited transmission signal y(n)' where i ∈{ 1, 2, . . . , k}. In at least one embodiment, each sample y(n)' is transmitted until each sample of data sequence x is transmitted.

The collaborative, MIMO communication receiving device channel estimation process 400 synthesizes a peak limited, precoded pilot signal $y_p(n)'$ for use in estimating the channel matrix H. In a collaborative system, both the transmitting device and receiving device know the contents of the pilot signal used to estimate the channel matrix H. Since peak limiting is a perturbation of the original pilot signal $x_p(n)$, peak limiting maintains the properties (such as constant amplitude and zero autocorrelation of CAZAC sequences) of the pilot signal. In at least one embodiment, process 400 estimates the channel matrix H using a pilot signal that is peak limited using the same peak limiting process as used by the transmitting device. Thus, process 400 is capable of determining a closer estimate of the channel matrix H than conventional channel estimation processes.

In operation 402, precoder 210 precodes the pilot signal $x(n)=x_p(n)$ to generate the precoded pilot signal $y(n)=y_p(n)$ using the preceding matrix P used by precoder 205 such that $y_p(n)=Px_p(n)$. In at least one embodiment, preceding matrix P is an equivalent version of the preceding matrix P used by precoder 205. In operation 404, peak limiter 212 peak limits the precoded pilot signal $y_p(n)$ to determine peak limited signal $y_p(n)'$. In at least one embodiment, peak limiter 212 uses the same or an equivalent peak limiting technique, such as tone reservation, as used by peak limiter 208. Thus, operations 402 and 404 represent at least one embodiment for synthesizing the peak limited pilot signal $y_p(n)'$. Peak limited pilot signal $y_p(n)'$ is a version of the peak limited pilot signal $y_p(n)'$ synthesized by subscriber station 202 because operations 302 and 304 are identical or at least the equivalent of respective operations 402 and 404.

In operation 406, the base station 204 receiver 214 includes m antennas 213.1-213.m to receive the transmitted, peak limited pilot signal from subscriber station 202. The signal actually received by receiver 214, signal r, is a function of the transmitted, peak limited pilot signal $y_p(n)'$, the channel matrix H and antenna generated noise $\eta$ such that $r=Hy_p(n)'+\eta$, where $y(n)'=y_p(n)'$.

In operation 408, the channel estimator 216 determines a detector matrix D. The detector matrix D incorporates the synthesized, peak-limited pilot signal $y_p(n)'$ from peak limiter 212. In at least one embodiment, the detector matrix D is derived in accordance with Equation [1]:

$$D=(y_p'^H(n)R_{HH}y_p'(n)+\sigma_n^2 I)^{-1} \cdot y_p'^H(n)R_{HH} \quad [1],$$

where $y_p(n)'^H$ is a hermitian vector of the synthesized, peak-limited pilot signal $y_p(n)'$ determined in operation 404, $R_{HH}$ is an auto correlation matrix of the channel, $\sigma$ is the variance of noise $\eta$ introduced by at least one of the m multiple antennas of base station 204, and I is an identity matrix.

In operation 410, channel estimator 216 determines an estimated channel matrix $\hat{H}$ (also referred to as the "estimated channel $\hat{H}$") using the received signal r and the detector matrix D in accordance with Equation [2]:

$$rD=\hat{H} \quad [2].$$

Since the channel matrix H can change over time and as the location of the subscriber station 102 changes, processes 300 and 400 can be repeated as desired to determine updated estimates of channel matrix H. Additionally, processes 300 and 400 can be reversed with the base station 204 becoming the transmitting device and the subscriber station 202 becoming the receiving device.

Once operation 410 determines the estimated channel matrix $\hat{H}$, decoder 218 uses the estimated channel matrix $\hat{H}$ to decode future received signals $r=Hy'+\eta$ in accordance with decoding technology. The decoding technology is a matter of design choice and can, for example, be any conventional decoding technology.

Subscriber station 202 and base station 204 can be implemented using (i) hardware or (ii) hardware and software. For example, processes 300 and 400 can be implemented in software as software code, stored in a data storage device, and executed by a processor. Subscriber station 202 and base station 204 also include additional functionality, such as speakers, data entry devices (e.g. key pads), and displays, to facilitate practical use.

Figure 5:
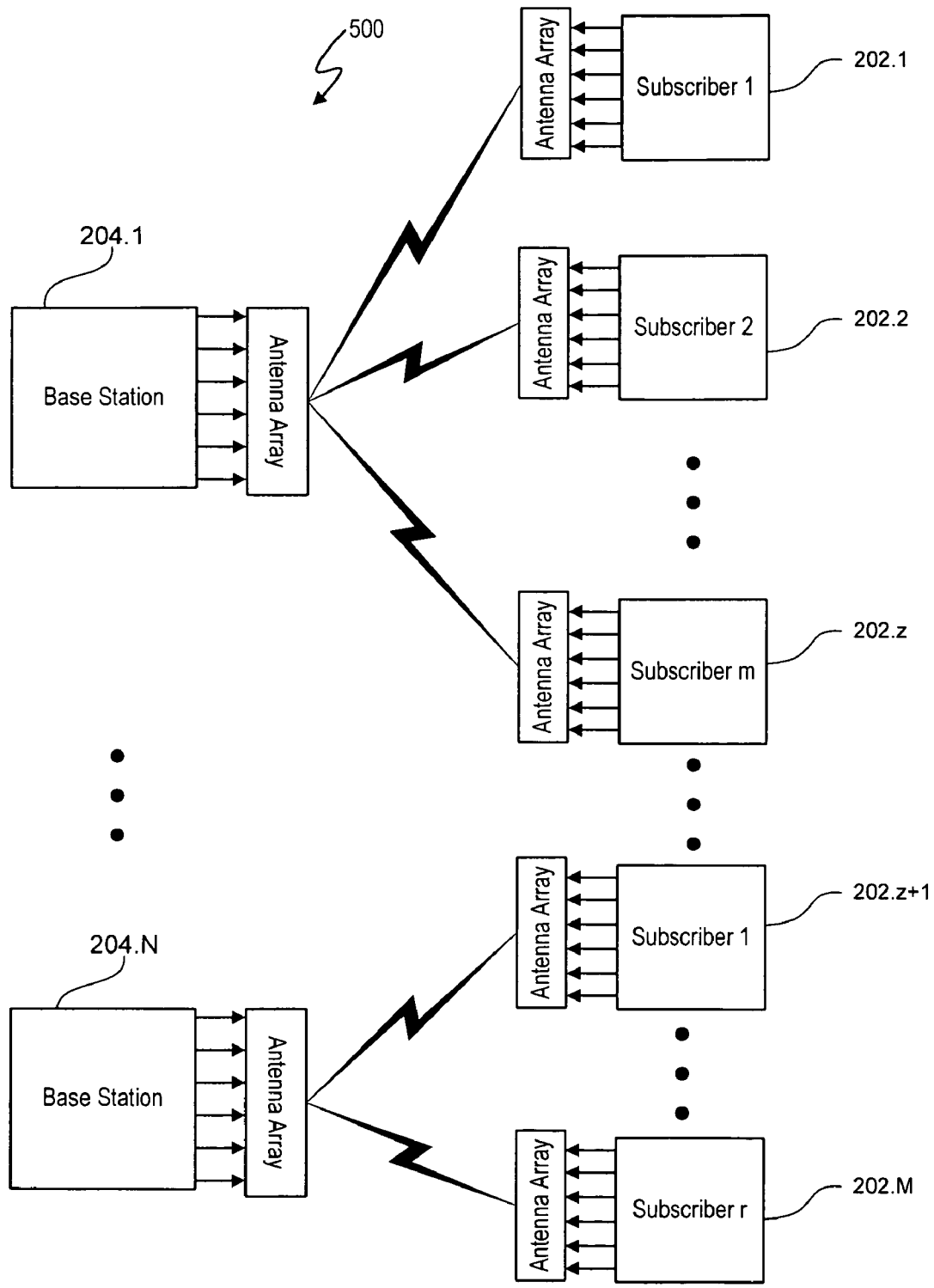
FIG. 5 depicts a MIMO wireless communication system with multiple subscriber stations and base stations.

FIG. 5 depicts MIMO wireless communication system 500 with multiple subscriber stations 202.1-202.M and base stations 204.1-204.N, where M and N are respective integers representing the number of respective subscriber stations and base stations. In at least one embodiment, at least one of subscriber stations 202.1-202.M include the capabilities of subscriber station 202 and at least one of base stations 204.1-204.N include the capabilities of base station 204.

Thus, the communication system 200 can estimate the channel matrix H using a pilot signal that is peak limited using the same peak limiting process as used by the transmitting device. Thus, the channel matrix $\hat{H}$ estimated by communication system 200 represents a closer estimate of the channel matrix H than conventional channel estimation processes and, thus, can provide better corresponding performance than conventional MIMO wireless communication systems.

Although the present invention has been described in detail, it should be understood that various changes, substitutions and alterations can be made hereto without departing from the spirit and scope of the invention as defined by the appended claims.

What is claimed is:

1. A wireless communication method for a multiple input, multiple output (MIMO) system that includes MIMO channel estimation using peak-limited pilot signals, the method comprising:

receiving a transmitted, peak-limited pilot signal on m multiple antennas of a receiver, wherein "m" is an integer greater than one (1) and the transmitted, peak-limited pilot signal is based on a first pilot signal, and wherein receiving the transmitted, peak-limited pilot signal further comprises receiving signal r, where signal r is a vector and $r=Hy_p(n)'+\eta$, H is a matrix representing a MIMO channel, $y_p(n)'$ is a vector representing the peak-limited version of the first pilot signal, and $\eta$ is a vector representing noise; and determining an estimated MIMO channel from the received peak-limited pilot signal using a synthesized, peak-limited version of the first pilot signal, wherein the synthesized, peak-limited version of the first pilot signal is synthesized at the receiver.

2. The method of claim 1 wherein receiving the transmitted peak-limited pilot signal on m multiple antennas further comprises:

receiving a subscriber station transmitted peak-limited pilot signal on m multiple antennas of a base station.

3. The method of claim 1 wherein receiving the transmitted peak-limited pilot signal on m multiple antennas further comprises:

receiving a base station transmitted peak-limited pilot signal on m multiple antennas of a subscriber station.

4. The method of claim 3 wherein the subscriber station is selected from the group consisting of cellular telephones, wireless equipped computer systems, and wireless personal digital assistants.

5. The method of claim 1 further comprising:

precoding a pilot signal to generate a precoded pilot signal;

peak-limiting the precoded pilot signal to synthesize the peak-limited version of the first pilot signal;

wherein determining an estimated MIMO channel from the received peak-limited pilot signal using a synthesized, peak-limited version of the first pilot signal, comprises:

determining the estimated MIMO channel using a detector matrix D that incorporates the synthesized, peak-limited version of the first pilot signal.

6. The method of claim 5 wherein peak-limiting the precoded pilot signal to synthesize the peak-limited version of the first pilot signal comprises:

peak-limiting the precoded pilot signal using tone reservation peak-limiting.

7. The method of claim 5 further comprising:

deriving the detector matrix D in accordance with:

$$D=(y_p'^H(n)R_{HH}y_p'(n)+\sigma_n^2 I)^{-1} \cdot y_p'^H(n)R_{HH}$$

wherein $y_p'^H(n)$ is a hermitian vector of the synthesized, peak-limited version of the first pilot signal, $R_{HH}$ is an auto correlation matrix of a channel, $\sigma$ is the variance of noise $\eta$ introduced by at least one of the m multiple antennas of a base station, and I is an identity matrix;

wherein receiving the transmitted peak-limited pilot signal further comprises:

receiving signal r, wherein signal r is a vector and $r = H y_p(n)' + \eta$, wherein H is a matrix representing a MIMO channel, $y_p(n)'$ is a vector representing the peak-limited version of the first pilot signal, and $\eta$ is a vector representing noise; and determining the estimated MIMO channel in accordance with:

$$rD = \hat{H}.$$

8. A signal processing system comprising:

a receiver having m multiple antennas to receive a signal, wherein "m" is an integer greater than one (1); and a processor, coupled to the receiver, to determine an estimated multiple input, multiple output (MIMO) channel from the received signal when the received signal is a peak-limited pilot signal that is based on a first pilot signal, wherein the estimated MIMO channel is determined using a synthesized, peak-limited version of the first pilot signal, and wherein the received signal is a vector equal to $Hy_p(n)' + \eta$, wherein H is a matrix representing a MIMO channel, $y_p(n)'$ is a vector representing the peak-limited version of the first pilot signal, and $\eta$ is a vector representing noise.

9. The signal processing system of claim 8 further comprising:

a detector to determine the estimated MIMO channel using a detector matrix D that incorporates the synthesized, peak-limited version of the first pilot signal.

10. The signal processing system of claim 8 wherein the signal processing system is a base station.

11. The signal processing system of claim 8 wherein the signal processing system is a subscriber station.

12. The signal processing system of claim 11 wherein the subscriber station is selected from a group consisting of cellular telephones, wireless equipped computer systems, and wireless personal digital assistants.

13. The signal processing system of claim 8 further comprising:

a precoder to precode a pilot signal to generate a precoded pilot signal;

a peak-limiter to peak-limit the precoded pilot signal to synthesize the peak-limited version of the first pilot signal; and wherein the MIMO channel is determined using a detector matrix D that incorporates the synthesized, peak-limited version of the first pilot signal.

14. The signal processing system of claim 13 wherein the peak-limiter peak-limits the precoded pilot signal using tone reservation peak-limiting.

15. The signal processing system of claim 13 wherein:

the detector matrix D is represented by:

$$D = (y_p'^H(n) R_{HH} y_p'(n) + \sigma_n^2 I)^{-1} \cdot y_p'^H(n) R_{HH}$$

wherein $y_p'^H(n)$ is a hermitian vector of the synthesized, peak-limited version of the first pilot signal, $R_{HH}$ is an auto correlation matrix of a channel, a is the variance of noise $\eta$ introduced by at least one of the m multiple antennas of a base station, and I is an identity matrix; and the received signal is a vector equal to $Hy_p(n)' + \eta$, wherein H is a matrix representing an estimate of the MIMO channel, $y_p(n)'$ is a vector representing the peak-limited version of the first pilot signal, and $\eta$ is a vector representing noise; and the processor is further configured to determine the estimated MIMO channel in accordance with:

$$rD = \hat{H}.$$

16. A multiple input, multiple output (MIMO) communication system for communicating between at least one first device and at least one second device using an estimated MIMO channel determined using a peak-limited first device pilot signal and a corresponding peak-limited second device pilot signal that is synthesized at the second device, the communication system comprising:

a receiver of the second device having m multiple antennas to receive the peak-limited first device pilot signal, wherein "m" is an integer greater than one (1); and a channel estimator, coupled to the receiver, to determine an estimated MIMO channel from the received peak-limited first device pilot signal using the corresponding peak-limited second device pilot signal, wherein the estimated MIMO channel is determined using a detector matrix D that incorporates the corresponding peak-limited second device pilot signal.

17. The MIMO communication system of claim 16 wherein the first device comprises a subscriber station and the second device comprises a base station.

18. The MIMO communication system of claim 16 wherein the first device pilot signal is equal to the second device peak-limited pilot signal.

* * * * *